(No Model.) 2 Sheets—Sheet 1.

J. G. XANDER.
CYCLE.

No. 493,201. Patented Mar. 7, 1893.

Witnesses:
R. Schleicher
F. D. Goodwin

Inventor:
John G. Xander
by his Attorneys
Howson & Howson (No Model.) 2 Sheets—Sheet 2.
J. G. XANDER.
CYCLE.
No. 493,201. Patented Mar. 7, 1893.
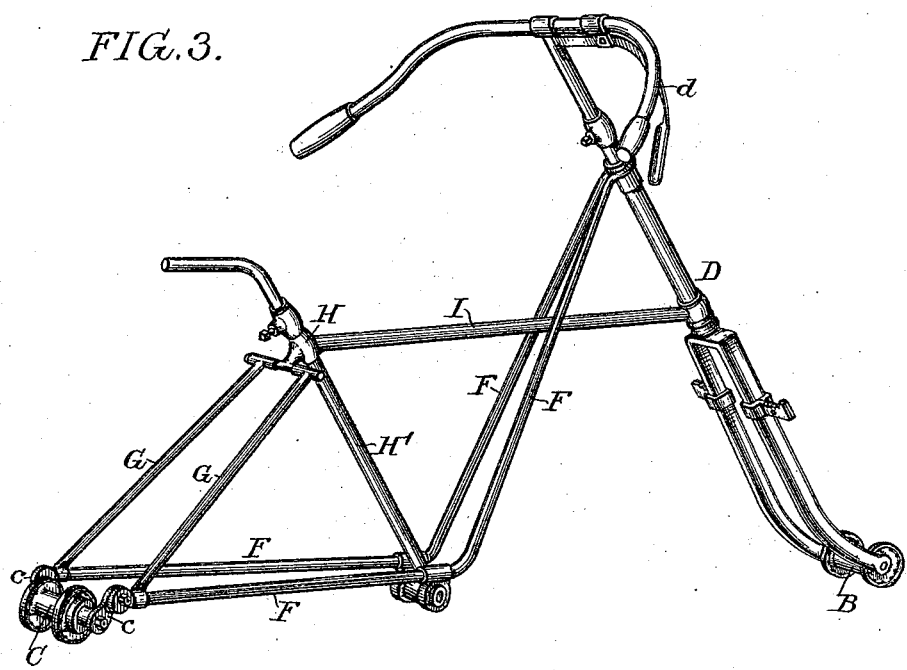
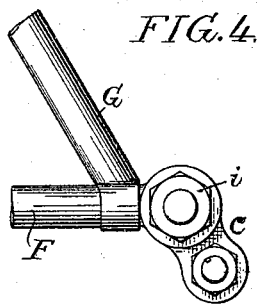
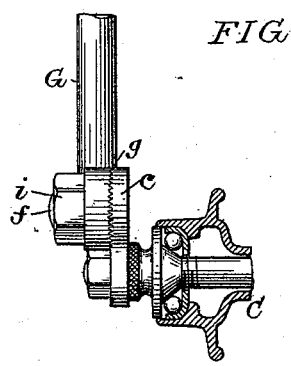
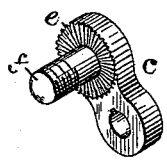
Witnesses:
R. Schleicher
F. D. Goodwin
Inventor:
John G. Xander
by his Attorneys
Howson & Howson

UNITED STATES PATENT OFFICE.

JOHN G. XANDER, OF READING, PENNSYLVANIA, ASSIGNOR OF ONE-HALF TO JAMES C. REBER, OF SAME PLACE.

CYCLE.

SPECIFICATION forming part of Letters Patent No. 493,201, dated March 7, 1893.

Application filed September 14, 1892. Serial No. 445,888. (No model.)

*To all whom it may concern:*

Be it known that I, JOHN G. XANDER, a citizen of the United States, and a resident of Reading, Pennsylvania, have invented certain Improvements in Bicycles, of which the following is a specification.

My invention relates to certain improvements in the construction of bicycles and has special reference to the construction and arrangement of the various tubes and bars which constitute the frame of the machine, and further, relates to improvements in devices for adjusting the tension of the driving chain, as more fully set forth hereinafter.

Figure 1:
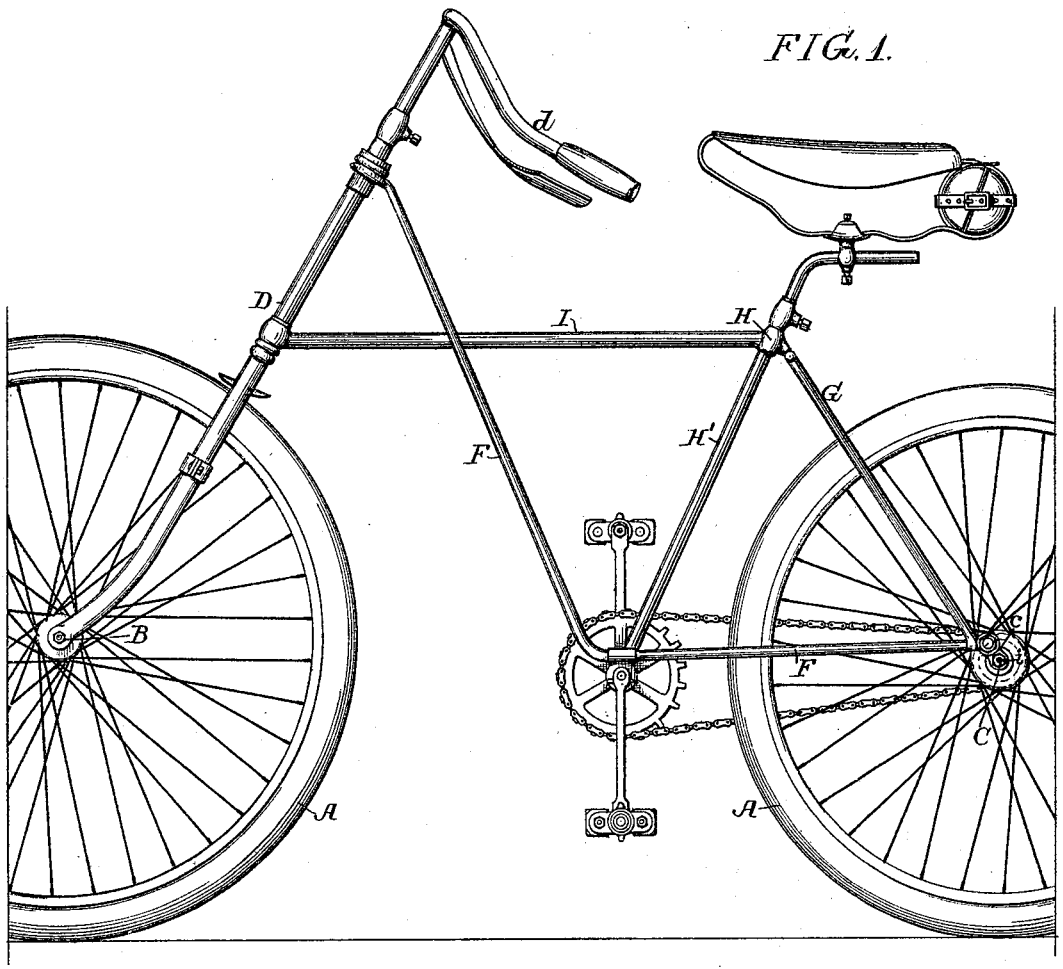
Figure 2:
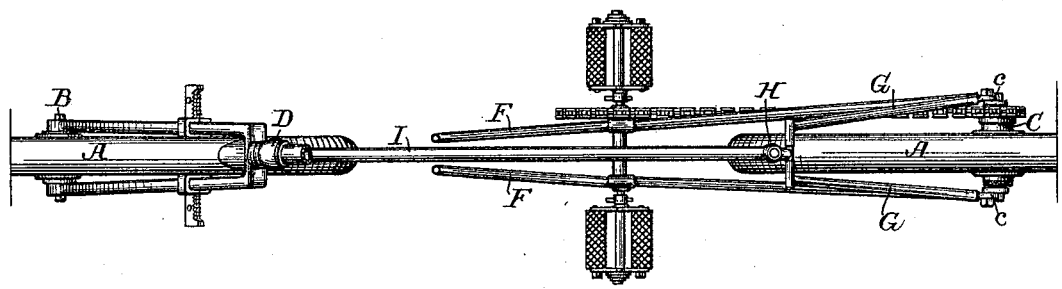

In the accompanying drawings:—Figure 1, is a side elevation of a bicycle constructed in accordance with my invention. Fig. 2, is a sectional plan view on the line 1—2, Fig. 1. Fig. 3, is a perspective view of the frame of the machine. Fig. 4, is an elevation of a portion of the machine at the rear axle. Fig. 5, is an end view of the same showing a portion of the rear axle in section; and Fig. 6, is a detached perspective view of one of the details of the chain adjusting mechanism.

Safety bicycles as ordinarily constructed are generally provided with what is termed a diamond-shaped frame but as a general rule the frame is not of a true diamond shape, the upper tube extending from the upper portion of the seat standard to the steering head being joined to the steering head at a point some distance above the lower bar, weakening the frame considerably and causing breakage of the top bar at, or close to, the steering head.

In my improved frame the tubes run from the center of the rear axle, are continued on through the crank axle bracket up to the top of the steering head and the tube from the front of the seat post bracket extends to the bottom of said steering head, the tubes from the rear axle extending on either side of the tube from the seat post bracket and making a true diamond frame and giving to all the tubes in the frame a direct crushing and tension strain when riding over an obstacle or when the machine is strained by the spreading of the wheels.

Referring to the drawings, A, A, represent the wheels of the structure, which are mounted upon front and rear axles B and C, the steering head D being of the ordinary construction and provided at its upper end, with the usual handle bars $d$. The rear axle C is carried between two adjustable cranked blocks $c$ (see Fig. 6) which are attached respectively to the side bars or tubes F F extending from thence to the crank axle bracket and continuing up to the top of the steering head where they are joined together and secured to said steering head.

G represents the rear bars extending from the rear end of the side bars F to the seat post bracket H and from the front of the seat post bracket extends a tube I to the lower end of the steering head D to which it is securely fastened, the bar I being passed loosely between the two side bars F and not being secured to either of them. The seat standard H' extends from the crank axle bracket and supports an ordinary form of saddle J. It will be obvious that by arranging the frame in this manner any strains which may come upon the various parts of the frame will be received in a direction most favorable to the tubes, as for instance if the front wheel strikes an obstruction the bar I will receive the pushing or crushing strain from its point of attachment to the steering head to the seat post bracket, and the bars F will receive the tensile strain; while in passing over an obstacle, when the rear wheel is thrown backward, and the machine strained by the spreading of the wheels, the bar F receives the crushing strain and the bar I the tensile strain, and I have found in practice that a frame constructed in this manner will last for a much longer time and will stand much more severe usage than a frame of the ordinary type.

Another feature of my invention consists in the construction of a device for taking up the wear of the driving chain, and to this end the rear axle C is held between the cranked blocks $c$ to which the axle is secured by a key which allows longitudinal adjustment of the axle and said blocks are provided with serrated faces $e$ and projecting pivot points $f$ which may or may not be formed integral with the blocks $c$. The tubes F are flattened and are likewise provided with serrated faces $g$ and each has an orifice through which may pass the pivot point $f$; the two being locked together by the application of a nut $i$ to the threaded portion of the pivot point $f$ as shown in Figs. 4 and 5. With this construction it will be apparent that if the driving chain be loose from wear it may readily be tightened by throwing the rear axle some distance to the rear, the nut $i$ being first loosened and sufficient downward pressure being exerted upon the frame to throw the axle back causing the blocks $c$ to swing on the centers $f$, and spreading the wheels for some distance and then holding the frame down until the nut $i$ has been tightened.

Having thus described my invention, I claim and desire to secure by Letters Patent—

1. The combination in a bicycle of the supporting wheels, the seat standard, the steering head, steering bar extending through said head, bars or tubes extending from the seat post bracket to the rear axle, a bar or tube, as I, extending from the seat post bracket to the lower end of the steering head, and bars or tubes extending from the rear axle through the crank axle bracket to the upper end of said steering head and disconnected from the said bar I, substantially as specified.

2. The combination in a bicycle of the supporting wheels, the seat standard, steering head, steering bar extending through said head, a bar I extending from the lower portion of said steering head to the seat post bracket, bars G extending from said seat post direct to the rear axle and side bars F extending from the rear axle through the crank axle bracket to the upper portion of the said steering head and situated one on either side of said bar or tube I, but disconnected therefrom, substantially as specified.

3. The combination in a bicycle of the supporting wheels, the frame, the crank axle bracket, crank shaft and driving cranks carried thereby, a sprocket wheel mounted on said driving shaft, a sprocket wheel mounted on the rear axle of the machine, a link belt connecting said sprocket wheels, cranked arms carrying said rear axle and devices for adjusting and rigidly securing said cranked arms to the frame of the machine, substantially as specified.

4. The combination in a chain adjustment for bicycles of the serrated clamping faces carried by the frame, cranked adjusting blocks $c$ having serrated clamping faces, adjusting nuts, securing said cranked blocks to the frame and bearings for the rear axle carried by said cranked blocks, substantially as specified.

5. The combination of the frame of the machine, the rear axle, cranked blocks $c$ carrying said rear axle, serrated faces on said cranked blocks and on the frame, a pivot pin $f$ carried by each of said cranked blocks and adjusting nuts adapted to said pivot pins, substantially as specified.

In testimony whereof I have signed my name to this specification in the presence of two subscribing witnesses.

JOHN G. XANDER.

Witnesses:
JOHN ZUBER,
D. RANDENBUSH.